US009422002B2

(12) United States Patent
Li et al.

(10) Patent No.: US 9,422,002 B2
(45) Date of Patent: Aug. 23, 2016

(54) FUEL CELL AND BATTERY POWERED VEHICLE PARKING

(71) Applicant: Ford Global Technologies, LLC, Dearborn, MI (US)

(72) Inventors: Yonghua Li, Ann Arbor, MI (US); Milos Milacic, New Boston, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 23 days.

(21) Appl. No.: 14/301,952

(22) Filed: Jun. 11, 2014

(65) Prior Publication Data

US 2015/0360720 A1    Dec. 17, 2015

(51) Int. Cl.
*G01C 21/00* (2006.01)
*B62D 15/02* (2006.01)
*G01C 21/34* (2006.01)
*G01C 21/36* (2006.01)

(52) U.S. Cl.
CPC ......... *B62D 15/027* (2013.01); *B62D 15/0285* (2013.01); *G01C 21/3407* (2013.01); *G01C 21/3453* (2013.01); *G01C 21/3679* (2013.01)

(58) Field of Classification Search
CPC ........ G01C 21/26; G01C 21/36; G01C 21/00; G01C 21/3611; G08G 1/096827
USPC .......................................... 701/400
See application file for complete search history.

(56) References Cited

U.S. PATENT DOCUMENTS

| 8,676,400 | B2 | 3/2014 | Tippelhofer et al. |
| 2011/0191266 | A1 | 8/2011 | Matsuyama |
| 2011/0224899 | A1 | 9/2011 | Mathews |
| 2012/0078504 | A1* | 3/2012 | Zhou ............... G01C 21/3611 701/411 |
| 2012/0200430 | A1 | 8/2012 | Spahl |
| 2013/0176147 | A1 | 7/2013 | Anderson et al. |
| 2013/0285841 | A1* | 10/2013 | Kirsch ............... G08G 1/143 340/932.2 |

FOREIGN PATENT DOCUMENTS

| DE | 102005027250 A1 | 12/2006 |
| DE | 102005029993 | 1/2007 |
| DE | 102010054081 A1 | 6/2012 |
| DE | 102011087436 A1 | 6/2013 |
| WO | 2014140415 A1 | 9/2014 |

OTHER PUBLICATIONS

Emma Beck, USA Today, "Smartphone apps put parking spots at your fingertips", Mar. 3, 2013, http://www.usatoday.com/story/news/nation/2013/03/03/mobile-parking-application/1946323/, 3 pages.
GB Search Report for Application No. GB1510107.4 dated Nov. 20, 2015 (1 page).

* cited by examiner

*Primary Examiner* — Maceeh Anwari
(74) *Attorney, Agent, or Firm* — Frank MacKenzie; Bejin Bieneman PLC

(57) ABSTRACT

A vehicle system includes a communication interface configured to receive parking information from an infrastructure device. The parking information identifies at least one open parking space and at least one characteristic associated with the parking space. The vehicle system further includes a processing device configured to select the at least one parking space based at least in part on the characteristic.

18 Claims, 2 Drawing Sheets

FUEL CELL AND BATTERY POWERED VEHICLE PARKING

BACKGROUND

Extreme ambient temperatures can limit fuel cell and battery performance. Exposing fuel cells and batteries to extreme temperatures can, over time, cause irreversible physical or chemical changes, resulting in reduced life expectancy and poor performance. During use, the heat generated can sometimes be sufficient to prevent damage or performance degradation. No heat is generated, however, when the fuel cell or battery is not in use. Thus, fuel cells and batteries are most vulnerable to the irreversible damage caused by extreme ambient temperatures while turned off for extended periods of time.

DETAILED DESCRIPTION

An example vehicle system is configured to help a driver park a vehicle in a parking space that is less likely to expose on-board fuel cells, batteries, or both to extreme ambient temperatures. For instance, the vehicle system may receive, from an infrastructure device associated with, e.g., a parking garage or surface lot, characteristics of each available parking space. The characteristics may include the ambient air temperature for the parking space and whether the parking space is exposed to direct sunlight or the elements. The vehicle system may select the parking space that best limits the exposure of on-board fuel cells or batteries to extreme ambient temperatures, especially if the vehicle is to be parked for a longer period of time (e.g., at least a few days). The amount of time the vehicle is to be parked may be determined from a user input or an electronic calendar system.

The elements shown in the FIGS. may take many different forms and include multiple and/or alternate components and facilities. The exemplary components illustrated are not intended to be limiting. Indeed, additional or alternative components and/or implementations may be used.

Figure 1:
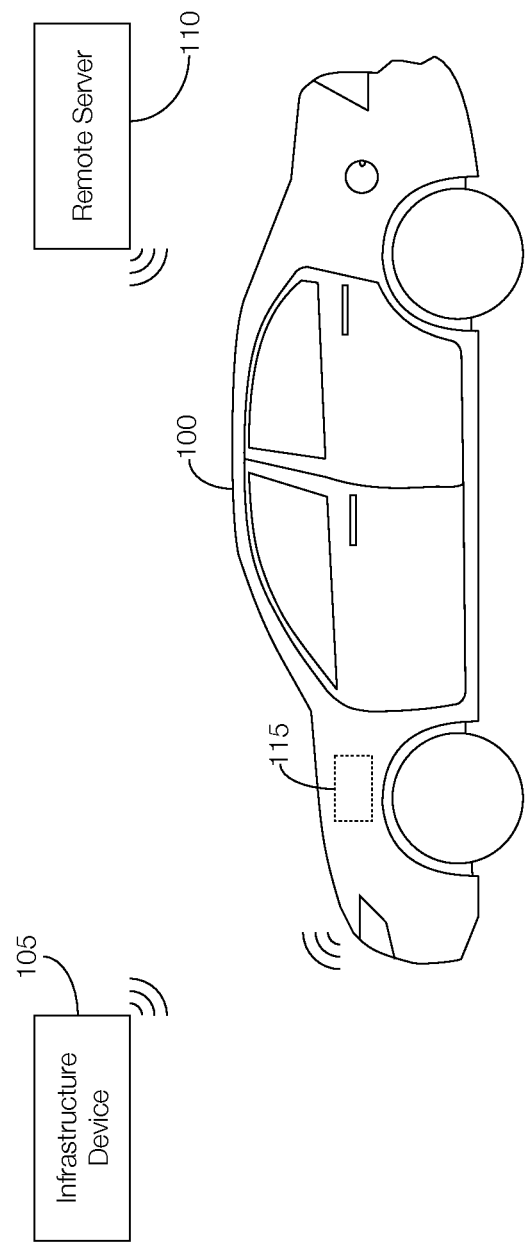
FIG. 1 illustrates an example vehicle configured to identify and select parking spaces that will protect an on-board power source from exposure to extreme ambient air temperatures.

As illustrated in FIG. 1, a vehicle 100 is configured to select a parking space based on information received from an infrastructure device 105. The infrastructure device 105 may include any device configured for, e.g., wireless communication with the vehicle 100. The infrastructure device 105 may be associated with a parking garage, a surface lot, or the like. As the vehicle 100 approaches the infrastructure device 105, the vehicle 100 may transmit vehicle information. Examples of vehicle information may include whether the vehicle 100 has any on-board fuel cells or batteries and how long the vehicle 100 will be parked. In some instances, the vehicle 100 may further transmit weather information (e.g., a weather forecast) to the infrastructure device 105. The weather information may be transmitted to the vehicle 100 from a remote server 110.

The infrastructure device 105 may respond to the communication from the vehicle 100 with parking information. The parking information may include an identification of open parking spaces and characteristics of each open parking space. Examples of characteristics may include whether the parking space is located in a garage, whether the parking space is exposed to direct sunlight, whether the parking space is located on a roof, whether the parking space is shaded, the average ambient temperature of the parking space, the typical range of temperatures for the parking space given the time of year and weather forecast, or the like.

The vehicle 100 may process the parking information and select one of the parking spaces based on, e.g., the space that is least likely to expose an on-board power source 115, such as any on-board fuel cells or batteries, to extreme ambient temperatures. The selection of the parking space may be further based on the parking duration. In general, a shorter parking duration (e.g., up to a few hours) may increase the number of acceptable parking spaces. Longer parking durations (e.g., a few hours up to several weeks or months) may require more careful selection since a longer parking duration may expose the vehicle 100 to more extreme ambient temperatures. Moreover, weather forecasts become increasingly unreliable over longer periods of time.

The vehicle 100 may be further configured to navigate to the selected parking space. In one possible approach, the vehicle 100 may identify the selected parking space to the infrastructure device 105, and the infrastructure device 105 may respond with directions to the selected parking space. The vehicle 100 may generate a route to the selected parking space based on the provided directions. The route may be displayed to a driver of the vehicle 100. In some possible implementations, the vehicle 100 may be configured to autonomously maneuver to the selected parking space.

Although illustrated as a sedan, the vehicle 100 may include any passenger or commercial vehicle such as a car, a truck, a sport utility vehicle, a taxi, a bus, etc. Moreover, as previously discussed, the vehicle 100 may be an autonomous vehicle configured to operate in an autonomous (e.g., driverless) mode, a partially autonomous mode, and/or a non-autonomous mode.

Figure 2:
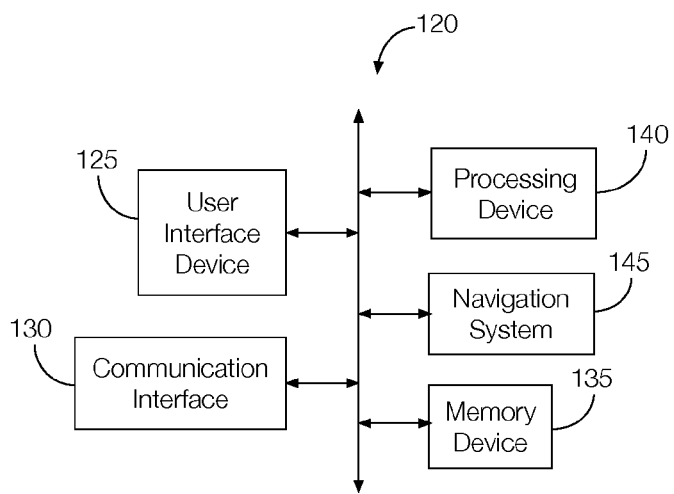
FIG. 2 is a block diagram of an example system for identifying and selecting parking spaces.

FIG. 2 is a block diagram of an example system 120 that may be incorporated into the vehicle 100 discussed above with reference to FIG. 1. As shown, the system 120 includes a user interface device 125, a communication interface 130, a memory device 135, a processing device 140, and a navigation system 145.

The user interface device 125 may be configured to present information to a user, such as a driver, during operation of the vehicle 100. Moreover, the user interface device 125 may be configured to receive user inputs. Examples of user inputs may include the selection of a parking space and an estimated parking duration. Received user inputs may be transmitted to the communication interface 130, the memory device 135, or the processing device 140, for example. The user interface device 125 may be located in a passenger compartment of the vehicle 100. In some possible approaches, the user interface device 125 may include a touch-sensitive display screen.

The communication interface 130 may be configured to facilitate wired and/or wireless communication between the components of the vehicle 100 and other devices, such as the infrastructure device 105 via, e.g., a vehicle-to-infrastructure protocol or even another vehicle when using, e.g., a vehicle-to-vehicle communication protocol. Examples of a vehicle-to-infrastructure communication protocol and a vehicle-to-vehicle communication protocol may include, e.g., the dedicated short range communication (DSRC) protocol. Moreover, the communication interface 130 may be configured to wirelessly communicate with the remote server 110 via any number of telecommunications protocols.

The communication interface 130, therefore, may be configured to transmit vehicle information, discussed above, to the infrastructure device 105. Moreover, the communication interface 130 may be configured to receive parking information from the infrastructure device 105. The parking information may include at least one characteristic associated with each available parking space. Once a parking space has been selected, the communication interface 130 may be configured to transmit the selected parking space to the infrastructure device 105 and receive directions to the selected parking space. Furthermore, the communication interface 130 may be configured to receive weather information from the remote server 110, and in some instances, transmit the weather information to the infrastructure device 105. The communication interface 130 may relay any received information, including parking information, weather information, and directions to the selected parking space, to the memory device 135, the processing device 140, or both.

The memory device 135 may be configured to store various information including vehicle information, parking information, weather information, the selected parking space, directions to the selected parking space, user inputs, or the like. The memory device 135 may make any stored information available to other components of the system 120. For example, the information stored in the memory device 135 may be made available to the processing device 140, the navigation system 145, or both.

The processing device 140 may be configured select a parking space based on the parking information received from the infrastructure device 105. In one possible implementation, the processing device 140 may query the infrastructure device 105 for the parking information. For instance, as the vehicle 100 approaches the infrastructure device 105, the processing device 140 may command the communication interface 130 to transmit the vehicle information to the infrastructure device 105. The processing device 140 may be configured to determine, from the characteristics of the available parking spaces transmitted with the parking information, which parking spaces are most likely to protect the on-board power source 115 from exposure to extreme ambient temperatures or elements. The processing device 140 may be configured to consider the characteristics of each available parking space relative to the estimated parking duration received from the user input device, user calendar information, or accessed from the memory device 135. The processing device 140 may further consider the weather information, the parking duration, or both when selecting a parking space. For example, if the estimated parking duration is less than a few hours, the processing device 140 may determine that any parking space, regardless of the expected extreme ambient temperatures and weather conditions, will suffice. That is, exposing the power source 115 to very high or very low temperatures for, e.g., an hour is not likely to cause long-term, irreversible damage. The selection of the parking space may be more important as the estimated parking duration increases, however. Therefore, the processing device 140 may be configured to give the expected extreme ambient temperatures and weather conditions for each available parking space greater weight when the estimated parking duration exceeds more than a few hours.

In some possible implementations, the processing device 140 may be configured to prompt an occupant, such as the driver of the vehicle 100, to select or confirm the selected parking space. The occupant may be prompted via the user interface device 125. Further, the occupant's response may be provided via the user interface device 125. The selection of the parking space may be transmitted to the navigation system 145.

For autonomous or partially autonomous vehicles, the processing device 140 may be configured to determine whether to autonomously maneuver the vehicle 100 to the selected parking space. If the vehicle 100 is to be operated autonomously, the processing device 140 may be configured to output a command to an autonomous mode controller configured to control the autonomous operation of the vehicle 100. The route to the selected parking space may be generated by the navigation system 145, described below. The autonomous mode controller may maneuver the vehicle 100 to the selected parking space by outputting command signals to various vehicle subsystems.

The navigation system 145 may be configured to determine a position of the vehicle 100, such as a current location of the vehicle 100. The navigation system 145 may include a Global Positioning System (GPS) receiver configured to triangulate the position of the vehicle 100 relative to satellites or terrestrial based transmitter towers. The navigation system 145, therefore, may be configured for wireless communication. The navigation system 145 may be further configured to develop routes from the current location to a selected destination, as well as display a map and present driving directions to the selected destination via, e.g., the user interface device 125. In some instances, the navigation system 145 may develop the route according to a user preference. Examples of user preferences may include maximizing fuel efficiency, reducing travel time, travelling the shortest distance, or the like.

The navigation system 145 may be configured to receive an identification of the selected parking space from the processing device 140, and in some instances, directions to the selected parking space transmitted from the infrastructure device 105. The navigation system 145 may be further configured to generate the route to the selected parking space. The navigation system 145 may output the route, along with a map, to the user interface device 125 to help an operator of the vehicle 100 navigate to the selected parking space. Alternatively, the navigation system 145 may work with the autonomous mode controller to autonomously maneuver the vehicle 100 to the selected parking space. That is, the navigation system 145 may be configured to output signals to the autonomous mode controller to help facilitate the autonomous operation of the vehicle 100.

Figure 3:
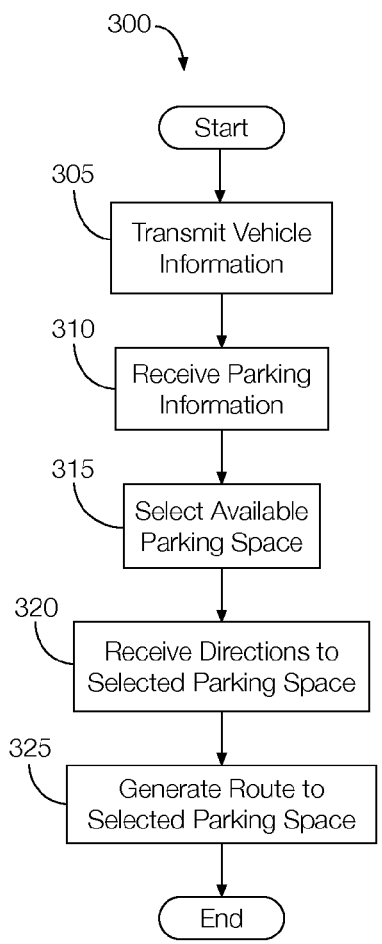
FIG. 3 is a flowchart of an example process that may be executed by the system of FIG. 2.

FIG. 3 is a flowchart of an example process 300 that may be implemented by one or more components of the system 120 of FIG. 2. For instance, the process 300 may be executed by, e.g., the processing device 140.

At block 305, the processing device 140 may transmit vehicle information to the infrastructure device 105. The processing device 140 may determine when the vehicle 100 is in proximity to the infrastructure device 105 based on signals received from the communication interface 130, the navigation system 145, or both. Once the proximity has been established, the processing device 140 may command the vehicle information stored in the memory device 135 to be transmitted to the infrastructure device 105 via, e.g., the communication interface 130. The vehicle information, as discussed above, may identify the type of power source 115 (i.e., a fuel cell, a battery, or both) incorporated into the vehicle 100, the estimated parking duration, etc.

At block 310, the processing device 140 may receive parking information. The parking information may be transmitted from the infrastructure device 105 to the vehicle 100. The communication interface 130 may receive the parking information and pass the parking information to the processing device 140 for processing. As discussed above, the parking information may identify characteristics of available parking spaces. The characteristics may include the average ambient temperature for each available parking space, the extreme ambient temperatures associated with each available parking space, whether the available parking space is exposed to the elements (in a parking garage, on the roof of a parking garage, on a surface lot, frequently exposed to direct sunlight, shaded, etc.). The extreme ambient temperatures may be estimated based on the time of year and subject to the estimated parking duration. For instance, if the estimated parking duration is a few hours from midday, the extreme ambient temperatures need not include overnight temperatures. The extreme ambient temperatures may further consider weather information received from the remote server 110. In some instances, the weather information may be transmitted from the vehicle 100 to the infrastructure device 105. Alternatively, the infrastructure device 105 may receive weather information from the remote server 110 without the vehicle 100 acting as an intermediary.

At block 315, the processing device 140 may select one of the available parking spaces. The processing device 140 may consider the characteristics described above and select the parking space that will limit exposure of any on-board power sources 115 to the least extreme ambient temperatures. For instance, to keep the on-board power source 115 from being exposed to extreme heat, the processing device 140 may select parking spaces located in a parking garage or infrequently exposed to direct sunlight. To protect the on-board power source 115 from extreme cold, the processing device 140 may select a parking space that receives significant, direct sunlight or is in a heated or insulated area. Once selected, the processing device 140 may transmit, via the communication interface 130, a message to the infrastructure device 105 indicating the selected parking space.

At block 320, the processing device 140 may receive, from the infrastructure device 105, directions to the selected parking space. The directions may be received at the vehicle 100 via the communication interface 130 and passed from the communication interface 130 to the processing device 140. The processing device 140 may transmit the directions to the navigation system 145. Alternatively, the directions may be passed to the navigation system 145 directly from the communication interface 130.

At block 325, the processing device 140 may command the navigation system 145 to generate a route to the selected parking space. The navigation system 145 may output a map of the route to the user interface device 125 to help an operator of the vehicle 100 navigate to the route. Alternatively, the navigation system 145 may communicate the route to the autonomous mode controller. The autonomous mode controller, therefore, may autonomously maneuver the vehicle 100 to the selected parking space by outputting command signals to a number of vehicle subsystems. The process 300 may end after block 325.

In general, computing systems and/or devices, such as the user interface device 125, the processing device 140, and the navigation system 145, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a communication interface configured to receive parking information from an infrastructure device associated with a parking area, the parking information identifying a location of at least one open parking space within the parking area and at least one characteristic associated with the parking space; and
   a processing device configured to select the at least one open parking space based at least in part on the characteristic wherein the characteristic includes at least one of an ambient temperature associated with the parking space and whether the parking space is exposed to sunlight, wherein the processing device is programmed to select the at least one parking space based at least in part on the parking space exposed to the least amount of sunlight.

2. The vehicle system of claim 1, further comprising a navigation system, wherein the processing device is configured to transmit the selected parking space to the navigation system.

3. The vehicle system of claim 2, wherein the navigation system is configured to generate a route to the selected parking space.

4. The vehicle system of claim 1, wherein the communication interface is configured to transmit vehicle information to the infrastructure device.

5. The vehicle system of claim 4, wherein the vehicle information identifies a power source.

6. The vehicle system of claim 5, wherein the power source includes at least one of a fuel cell and a battery.

7. The vehicle system of claim 4, wherein the vehicle information includes a parking duration.

8. The vehicle system of claim 1, wherein the parking information includes directions to the selected parking space.

9. The vehicle system of claim 1, wherein the processing device is configured to select the at least one parking space based at least in part on weather information.

10. The vehicle system of claim 1, wherein the processing device is configured to select the at least one parking space based at least in part on a parking duration.

11. A vehicle system comprising:
    a navigation system;
    a communication interface configured to receive parking information from an infrastructure device associated with a parking area, the parking information identifying a location of at least one open parking space in the parking area and at least one characteristic associated with the parking space; and
    a processing device configured to select the at least one parking space based at least in part on the characteristic and a parking duration wherein the characteristic includes at least one of an ambient temperature associated with the parking space and whether the parking space is exposed to sunlight, wherein the processing device is programmed to select the at least one barking space based at least in part on the parking space exposed to the least amount of sunlight,
    wherein the navigation system is configured to generate a route to the selected parking space.

12. The vehicle system of claim 11, wherein the communication interface is configured to transmit vehicle information to the infrastructure device.

13. The vehicle system of claim 12, wherein the vehicle information identifies a power source, the power source including at least one of a fuel cell and a battery.

14. A method comprising:
    transmitting vehicle information to an infrastructure device associated with a parking area;
    receiving parking information from the infrastructure device, the parking information identifying at least one open parking space in the parking area and at least one characteristic associated with the parking space; and
    selecting one of the parking spaces based at least in part on the characteristic wherein the characteristic includes at least one of an ambient temperature associated with the parking space and whether the parking space is exposed to sunlight, and wherein selecting one of the parking spaces includes selecting the parking space exposed to the least amount of sunlight.

15. The method of claim 14, further comprising generating a route to the selected parking space.

16. The method of claim 14, wherein the vehicle information identifies a power source, the power source including at least one of a fuel cell and a battery.

17. The method of claim 14, wherein the vehicle information includes a parking duration.

18. The method of claim 14, further comprising receiving directions to the selected parking space.

\* \* \* \* \*